United States Patent
Kobayashi

(10) Patent No.: US 9,672,390 B2
(45) Date of Patent: Jun. 6, 2017

(54) IC CARD AND COMMAND PROCESSING METHOD FOR IC CARD

(71) Applicant: KABUSHIKI KAISHA TOSHIBA, Minato-ku, Tokyo (JP)

(72) Inventor: Yuko Kobayashi, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 258 days.

(21) Appl. No.: 13/795,477

(22) Filed: Mar. 12, 2013

(65) Prior Publication Data

US 2013/0241706 A1  Sep. 19, 2013

(30) Foreign Application Priority Data

Mar. 19, 2012  (JP) .................................. 2012-062490

(51) Int. Cl.
*G06F 3/00* (2006.01)
*G06K 7/00* (2006.01)
*G06F 17/30* (2006.01)
*G06F 11/30* (2006.01)

(52) U.S. Cl.
CPC .......... *G06K 7/0008* (2013.01); *G06F 11/302* (2013.01); *G06F 11/3055* (2013.01); *G06F 17/30218* (2013.01)

(58) Field of Classification Search
CPC combination set(s) only.
See application file for complete search history.

(56) References Cited

U.S. PATENT DOCUMENTS

2011/0066761 A1  3/2011  Ishibashi

FOREIGN PATENT DOCUMENTS

JP  2009-075797 A  4/2009
JP  2011-216068 A  10/2011

OTHER PUBLICATIONS

Office Action dated Jul. 16, 2013 issued in corresponding EP patent application No. 13158933.5-1951.
Office Action issued Jan. 26, 2016 in the corresponding JP application No. 2012-062490 (with English translation).
European Search Report issued Feb. 8, 2016 in the corresponding EP application No. 13158933.5.
Office Action mailed Sep. 15, 2015 in the corresponding JP application No. 2012-062490 (with English translation).
Office Action dated Feb. 9, 2017 issued in the corresponding EP application No. 13 158 933.5.
Anonymous, Warnings and Errors, XP055304714, Feb. 18, 2012, pp. 1-1177.
Pankaj Pal, inode and file descriptor table interaction, XP055304940, Sep. 4, 2011, pp. 1-5.

*Primary Examiner* — Brian Zimmerman
*Assistant Examiner* — Cal Eustaquio
(74) *Attorney, Agent, or Firm* — Posz Law Group, PLC

(57) ABSTRACT

According to one embodiment, an IC card includes a communication unit, a controller, a data storage unit, a command processor, and a response unit. The controller performs data communication of the communication unit by using a logical channel. The command processor performs access to data specified by a command on a logical channel specified by the command. The response unit outputs a response message in response to the command, with the response message added with information indicating that the specified data is inaccessible because the data is used on an other logical channel, if the data specified by the command is inaccessible because the data is used on a channel other than the logical channel of the command.

20 Claims, 11 Drawing Sheets

| Response data field | | | Response trailer | |
|---|---|---|---|---|
| Data1 | Data2 | Data3 | SW1 | SW2 |
| | 0x0001(EF#1) | 0x01(Used on logical channel #1) | 0x69FF | |

FIG. 9

| Response data field | | | Response trailer | |
|---|---|---|---|---|
| Data1 | Data2 | Data3 | SW1 | SW2 |
| xxxx | 0x0001(EF#1) | 0x01(Used on logical channel #1) | 0x9001 | |

FIG. 10

| Response data field | | | Response trailer | |
|---|---|---|---|---|
| Data1 | Data2 | Data3 | SW1 | SW2 |
| xxxx | 0x0001(EF#1) | 0xFF(Unused) | 0x9001 | |

FIG. 11

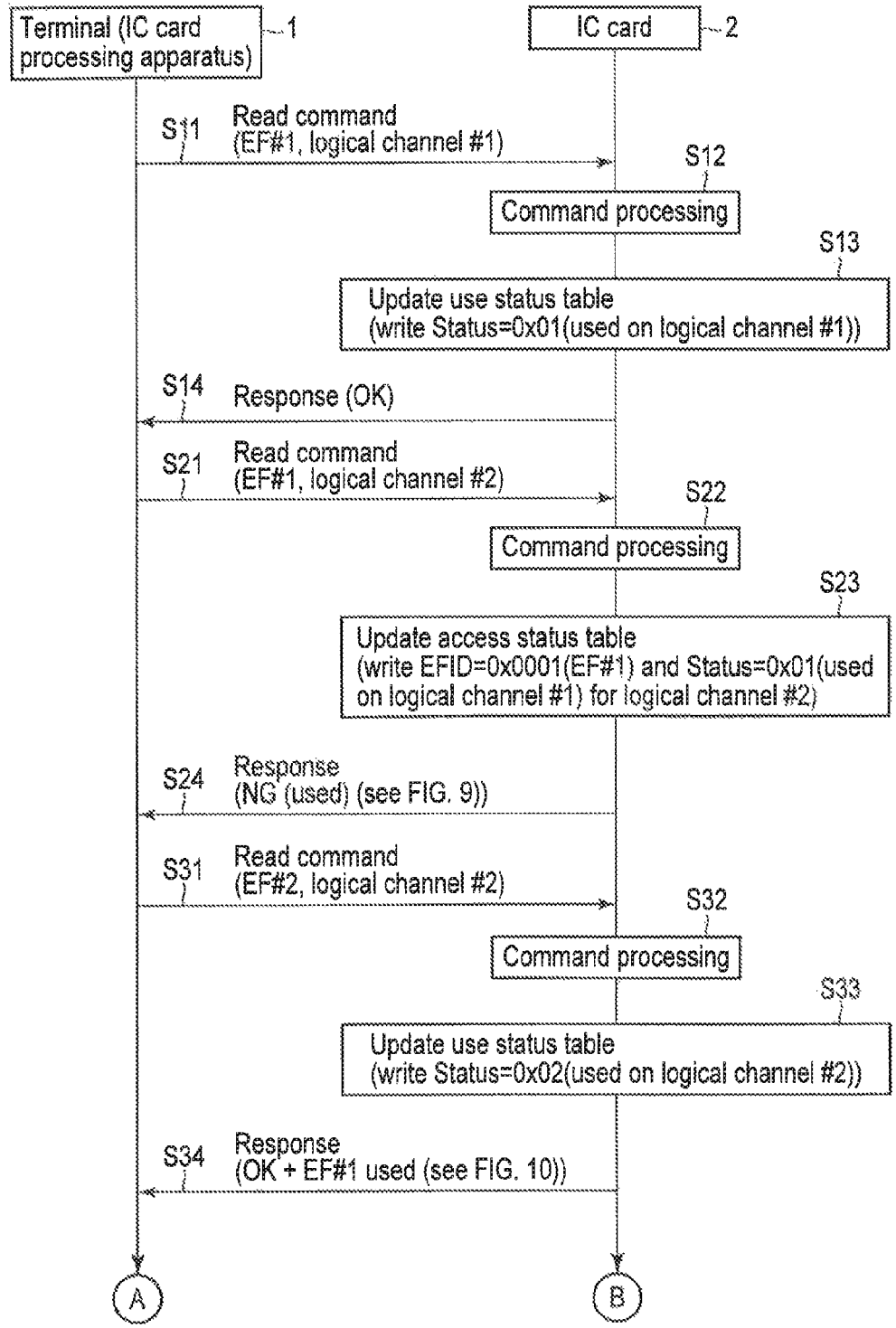
F I G. 12

| EF ID | Status |
|---|---|
| #1 | Unused |
| #2 | Unused |
| #3 | Unused |
| #4 | Unused |

FIG. 14 A

| Logical channel | EF ID | Status |
|---|---|---|
| #1 | | |
| #2 | | |

FIG. 14 B

| EF ID | Status |
|---|---|
| #1 | Logical channel #1 |
| #2 | Unused |
| #3 | Unused |
| #4 | Unused |

FIG. 15 A

| Logical channel | EF ID | Status |
|---|---|---|
| #1 | | |
| #2 | | |

FIG. 15 B

| EF ID | Status |
|---|---|
| #1 | Logical channel #1 |
| #2 | Unused |
| #3 | Unused |
| #4 | Unused |

FIG. 16 A

| Logical channel | EF ID | Status |
|---|---|---|
| #1 | | |
| #2 | #1 | Logical channel #1 |

| EF ID | Status |
|---|---|
| #1 | Logical channel #1 |
| #2 | Logical channel #2 |
| #3 | Unused |
| #4 | Unused |

| Logical channel | EF ID | Status |
|---|---|---|
| #1 | | |
| #2 | #1 | Logical channel #1 |

| EF ID | Status |
|---|---|
| #1 | Unused |
| #2 | Logical channel #2 |
| #3 | Unused |
| #4 | Logical channel #1 |

| Logical channel | EF ID | Status |
|---|---|---|
| #1 | | |
| #2 | #1 | Logical channel #1 |

| EF ID | Status |
|---|---|
| #1 | Unused |
| #2 | Unused |
| #3 | Logical channel #2 |
| #4 | Logical channel #1 |

| Logical channel | EF ID | Status |
|---|---|---|
| #1 | | |
| #2 | #1 | Logical channel #1 |

27

26

| EF ID | Status |
|---|---|
| #1 | Logical channel #2 |
| #2 | Unused |
| #3 | Unused |
| #4 | Logical channel #1 |

| Logical channel | EF ID | Status |
|---|---|---|
| #1 | | |
| #2 | | |

FIG. 20 B

IC CARD AND COMMAND PROCESSING METHOD FOR IC CARD

CROSS-REFERENCE TO RELATED APPLICATIONS

This application is based upon and claims the benefit of priority from Japanese Patent Application No. 2012-062490, filed Mar. 19, 2012, the entire contents of which are incorporated herein by reference.

FIELD

Embodiments described herein relate generally to an IC card, a portable electronic apparatus, and a comment processing method for an IC card.

BACKGROUND

There is conventionally an IC card which has a logical channel function of performing continuous processing for each of a plurality of channels. When a command to access an unsharable file used by another logical channel is received, the IC card which supports the logical channel function cannot access the received file, and therefore responds with abnormal termination of command processing. Conventionally, when a command which causes access to an unsharable file used on another logical channel is to be performed, the command is retried repeatedly until processing of the command succeeds.

BRIEF DESCRIPTION OF THE DRAWINGS

FIG. 9 shows a first example of a response message to a read command;

FIG. 10 is a second example of a response message as a response to a read command;

FIG. 11 is a third example of a response message as a response to a read command;

FIG. 12 is a sequence chart for explaining content of processings in response to a plurality of commands sequentially supplied from an IC card processing apparatus according to the embodiment;

FIG. 14A shows an example of a state of a use status table;

FIG. 14B shows an example of a state of an access status table;

FIG. 15A shows an example of a state of the use status table;

FIG. 15B shows an example of a state of the access status table;

FIG. 16A shows an example of a state of the use status table;

FIG. 16B shows an example of a state of the access status table;

FIG. 17A shows an example of a state of the use status table;

FIG. 17B shows an example of a state of the access status table;

FIG. 18A shows an example of a state of the use status table;

FIG. 18B shows an example of a state of the access status table;

FIG. 19A shows an example of a state of the use status table;

FIG. 19B shows an example of a state of the access status table;

FIG. 20A shows an example of a state of the use status table;

FIG. 20B shows an example of a state of the access status table;

DETAILED DESCRIPTION

In general, according to one embodiment, an IC card includes a communication unit, a controller, a data storage unit, a command processor, and a response unit. The communication unit communicates data with external devices. The controller performs data communication of the communication unit by using a logical channel selected from a plurality of logical channels. The data storage unit stores data in units of data as a target to access, depending on a command from an external apparatus. The command processor performs access to data specified by the command received by the communication unit, on a logical channel also specified by the command. If the data specified by the command is inaccessible because the data is used on a channel other than the logical channel of the command, the response unit outputs a response message in response to the command, with the response message added with information indicating that the specified data is inaccessible because the data is used on an other logical channel.

Hereinafter, an embodiment will be described with reference to the drawings.

Figure 1:
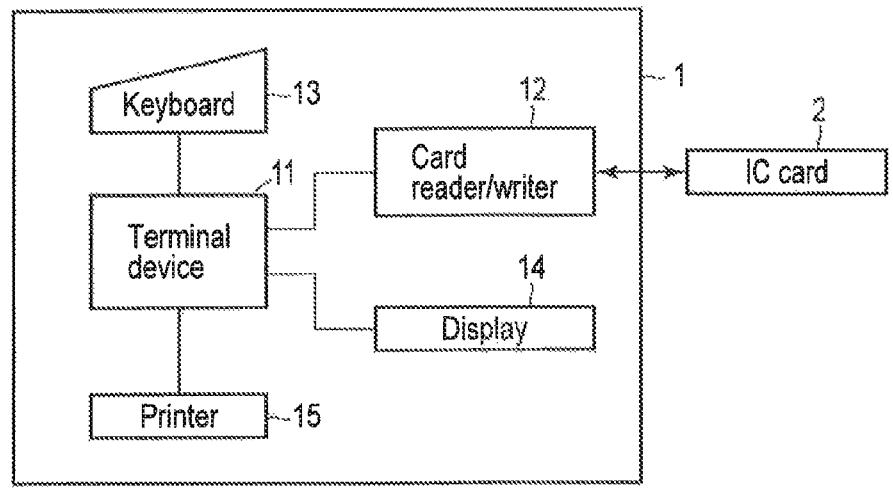
FIG. 1 shows an example configuration of an IC card and an IC card processing apparatus which communicates with the IC card, according to the present embodiment.

FIG. 1 is a block diagram schematically showing an example configuration of an IC card (a portable electronic apparatus) 2 according to the embodiment and an IC card processor 1 as an external device which has a function of communicating with the IC card 2.

The configuration of the IC card processing apparatus 1 described above will be described first.

The IC card processing apparatus 1 comprises a terminal device 11, a card reader writer 12, a keyboard 13, a display 14, and a printer 15, as shown in 1.

The terminal device 11 controls operation of the whole IC card processing apparatus 1. The terminal device 11 is configured by a CPU, various memories, and various interfaces. For example, the terminal device 11 is configured by a personal computer (PC).

The terminal device 11 has a function of transmitting a command to the IC card 2 by the card reader writer 12, and a function of performing various processings on the basis of data received from the IC card 2. For example, the terminal device 11 controls writing of data into a nonvolatile memory in the IC card 2 by transmitting a data write command to the IC card 2 through the card reader writer 12. Also, the terminal device 11 controls reading of data from the IC card 2 by transmitting a read command to the IC card 2.

The card reader writer 12 is an interface device for performing communication with the IC card 2. The card reader writer 12 is configured by an interface according to a communication system with the IC card 2. For example, if the IC card 2 is an IC card of a contact type, the card reader writer 12 is configured by a contact part of the IC card 2 for physically and electrically connecting with the contact part of the IC card 2. Otherwise, if the IC card 2 is of a non-contact type, the card reader writer 12 is configured by an antenna for wireless communication with the IC card 2. The card reader writer 12 supplies power and clocks to the IC card 2, performs reset control, and transmits/receives data to/from the IC card 2. Through the functions as described above, the card reader writer 12 activates (starts up) the IC card 2, transmits various commands, and receives responses to the commands transmitted, based on control by the terminal device 11.

The keyboard 13 functions as an operation unit operated by an operator of the IC card processing apparatus 1 and is input with various operation instructions and data by the operator. The display 14 displays various information by controlling the terminal device 11. The printer 15 is for printing out and outputting various data such as a processing result, etc.

Next, an example configuration of the IC card 2 will be described.

The IC card 2 is activated upon receipt of power supply from an apparatus on a higher level, such as the IC card processing apparatus 1 (e.g., the IC card 2 is made operational). For example, when the IC card 2 is connected to the IC card processing apparatus 1 by communication of a contact type, i.e., when the IC card 2 is of the contact type, the IC card 2 is activated upon supply of operation power and an operation clock.

When the IC card 2 is connected to the IC card processing apparatus 1 by a communication system of a non-contact type, i.e., when the IC card 2 is of the non-contact type, the IC card 2 receives an electric wave from the IC card processing apparatus 1 through an antenna and a modulation/demodulation circuit as a communication interface. The operation power and the operation clock are generated from the electric wave by a power supply unit not shown, to activate the IC card 2.

Figure 2:
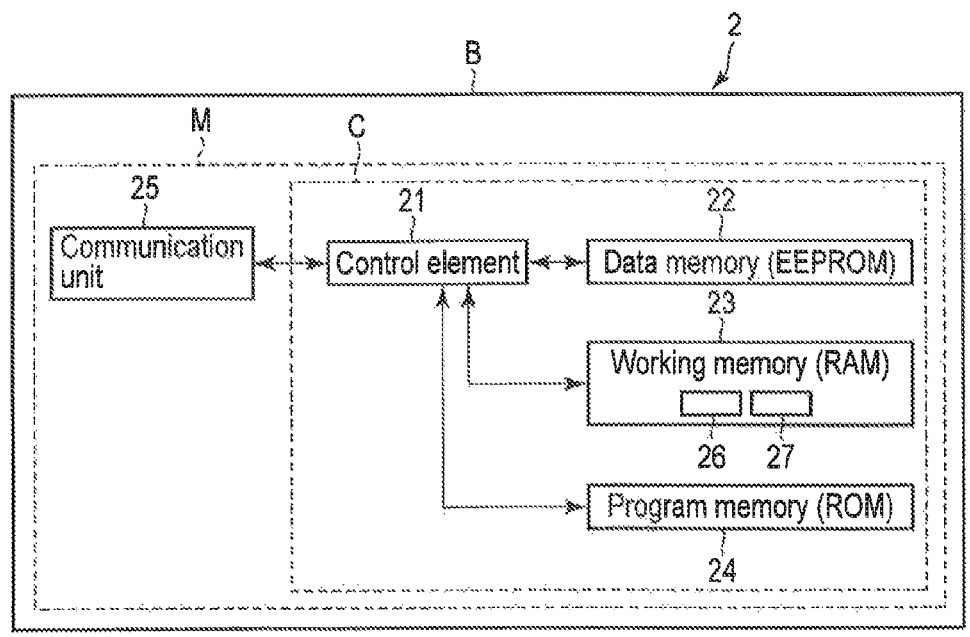
FIG. 2 is a block diagram showing an example configuration of an IC card according to the present embodiment.

FIG. 2 is a block diagram schematically showing an example hardware configuration of the IC card 2 according to the present embodiment.

A module M is built in a housing (body) B of a card type which is made of, for example, plastic. The module M is formed to be integrally connected with one or a plurality of chips C and an external interface for communication (communication interface), and is embedded in the body B. In addition, the module M of the IC card 2 comprises a control element 21, a data memory 22, a working memory 23, a program memory 24, and a communication unit 25, as shown in FIG. 2.

The control element 21 controls the whole IC card 2. The control element 21 performs various functions as the control element 21 operates based on the control program and control data which are stored in the program memory 24 or the data memory 22. For example, the control element 21 performs basic operation control of the IC card 2 by performing a program of an operating system. Further, the control element 21 performs various types of operation control according to operation modes of the IC card 2 by performing application programs according to utilization objects of the IC card 2.

Also, the control element 21 has a function of performing communication control and command processing by using a plurality of logical channels. The logical channels are logically defined under communication control using a physical communication interface with the outside. The control element 21 can perform communication control and command processing for each of the plurality of logical channels. Functions of the logical channels can be achieved by functions defined under ISO/IEC 7816-4 which is an IC card standard.

The data memory 22 is configured by a non-volatile memory capable of writing and rewriting data, such as an electrically erasable programmable read-only memory (EEPROM) or a flash ROM. A control program or various data is written into the data memory 22, depending on an operation application of the IC card 2. Various files according to the standards of the IC card 2 are defined in the data memory 22, and various data is written into the files. Examples of the files stored in the foregoing data memory 22 will be described later.

The working memory 23 is a volatile memory such as a RAM. The working memory (RAM) 23 also functions as a buffer which temporarily stores data under processing by the control element 21. Various tables indicating access statuses to the files, use statuses of the communications channel, and processing statuses are provided in the working memory 23. Examples of the tables stored in the working memory 23 will be described later.

The program memory 24 is a non-volatile memory, such as a mask ROM, which prestores a program for control, control data, etc. With a control program or control data stored in the program memory (ROM) 24, the program memory (ROM) 24 is built into the IC card 2 in a manufacturing stage of the IC card. That is, the control program or control data stored in the program memory 24 manages basic operations of the IC card, and is built in advance according to the specification of the IC card 2.

The communication unit 25 is an interface to communicate with the card reader writer 12 of the IC card processing apparatus 1. If the IC card 2 is performed as an IC card of the contact type, the communication unit 25 is configured by a communication controller and a contact unit for making physical and electrical contact with the card reader writer 12 of the IC card processing apparatus 1, to transmit/receive signals. Otherwise, if the IC card 2 is achieved as an IC card of the non-contact type, the communication unit 25 is configured by a communication controller such as a modulation/demodulation circuit to perform wireless communication with the card reader writer 12 of the IC card processing apparatus 1, and an antenna to transmit/receive electric waves.

Next, files stored in the data memory 22 will be described.

Figures 3, 4, 5:
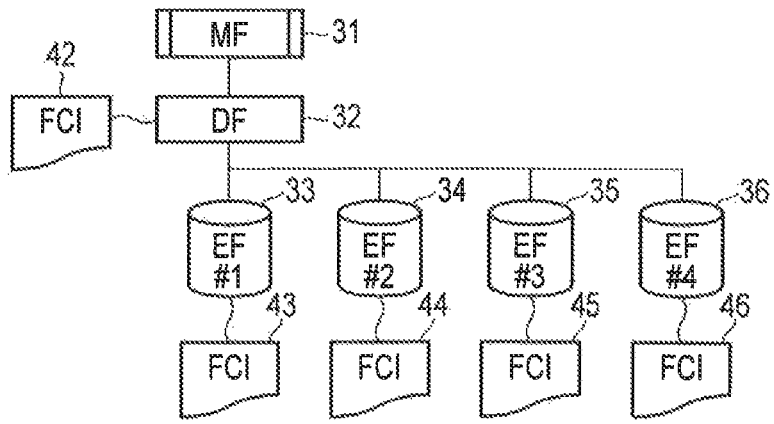
FIG. 3 shows an example configuration of a data memory of an IC card according to the present embodiment.
FIG. 4 shows an example configuration of FCI added to a DF.
FIG. 5 shows an example configuration of FCI added to an EF.

FIG. 3 shows an example structure of the files stored in the data memory 22.

As shown in FIG. 3, a plurality of file groups each of which has a layered structure comprising a master file (MF) 31, a dedicated file (DF) 32, and elementary files (EF) 33 to 36 are defined in the data memory 22. File control information FCI 42 to 46 corresponding to DF and EF is provided. The file structure as shown in FIG. 3 is defined under ISO/IEC 7816-4 which is an international standard for IC cards.

In the example shown in FIG. 3, the DF 32 exists in a layer next to the master file (MF) 31 in the highest layer. For example, a DF stores data for performing an application comprised in the IC card 2. An IC card which performs a plurality of functions by a plurality of applications may be provided with a plurality of DFs corresponding to the applications in the data memory 22.

In the example shown in FIG. 3, a first EF (EF#1) 33, a second IF (EF#2) 34, a third IF (EF#3) 35, and a fourth IF (EF#4) 36 exist in a layer next to a DF 32, subordinate to the DF 32. The EF 33 to 36 are data files for storing various kinds of data. Data is stored in each of the EFs 33 to 36 in any of predetermined data structures. For example, the EFs 33 to 36 each may be a fixe in which object data having a TLV structure is stored, i.e., an identifier (Tag), a data length (Length), and a data part (Value) are connected in series, or may be a file which stores binary data.

FCI 42 to 46 are respectively added to the DF 32 and the EFs 33 to 36. FCI 42 to 46 are control information items for respectively corresponding files (DF 32 and EFs 33 to 36). For example, information such as a security condition in a corresponding file is stored in each of the FCI 42 to 46. The FCI may also be defined under ISO/IEC 7816-4 which is an IC card standard.

Next, an example of the FCI 42 to 46 will be described.

FIG. 4 shows an example configuration of the FCI 42 added to the DF 32.

In the example configuration shown in FIG. 4, the FCI 42 indicates that FCI information is stored, for example, in a file-control-parameter (FCP) template format, "File descriptor byte" indicates that a OF as a corresponding file is a sharable file. That is, FIG. 4 shows an example configuration of FCI which makes a file sharable.

FIG. 5 shows an example configuration of the FCI 43 added to the EF 33.

Also in the example configuration shown in FIG. 5, the FCI 43 indicates that FCI information is stored in the file-control-parameter (FCP) template format. "File descriptor byte" indicates that an EF as a corresponding file is unsharable. That is, FIG. 5 shows an example configuration of FCI which makes a file unsharable.

Next, a description will be made of a table showing use statuses of files or access statuses to files on the logical channels.

At first, an example configuration of a use status table 26 showing use statuses of the files in the IC card 2 will be described.

Figure 6:
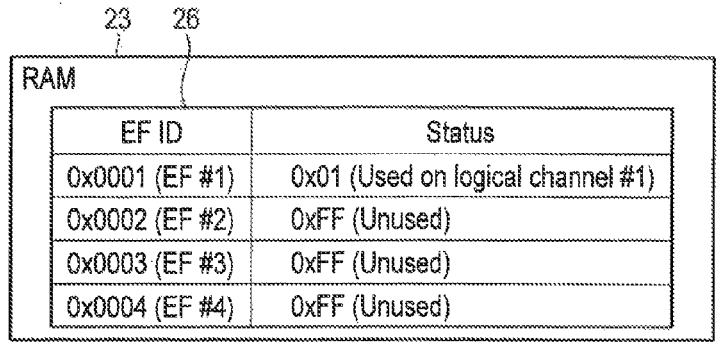
FIG. 6 shows art example of a use status table showing a use status of each file.

FIG. 6 shows an example of the use status table 26 indicating use statuses of files (EF). The use status table 26 as shown in FIG. 6 is set, for example, in the RAM (working memory) 23. In the IC card 2, the use status table 26 may be provided in a rewritable memory which the control element 21 can access, and may be provided in the data memory 22.

The use status table 26 stores information which indicates whether each EF is used or unused. For an EF currently used, the use status table 26 stores information which indicates a logical channel using a corresponding EF. For example, the use status table 26 stores status values respectively indicating use statuses of EFs, associated to statuses respectively indicating EFIDs (file identification information) indicating the EFs.

In the example shown in FIG. 6, "Status=0x00 to 0x13" indicates that a corresponding EF is used and that the EF is used by the logical channel of a channel number indicated by the value of "Status". Otherwise, "Status=0xFF" indicates that the corresponding EF is unused. "Status=others" indicates RFU.

The use status table 26 stores the EFID for each EF, and stores a value "0xFF" indicating "unused" as an initial value of the Status for each EFID. In the use status table 26 in this state, information indicating a used logical channel may be written as a status for an EF used on any of the logical channels. For example, as shown in FIG. 6, if a first EF 33 having an EFID of "0x0001" is used on a logical channel "#1", the value of the Status of the first EFID is rewritten with "0x01" indicating "used" on the logical channel "1".

Next, an example configuration of an access status table which stores access information indicating access statuses of access to files on the respective logical channels will be described.

Figure 7:
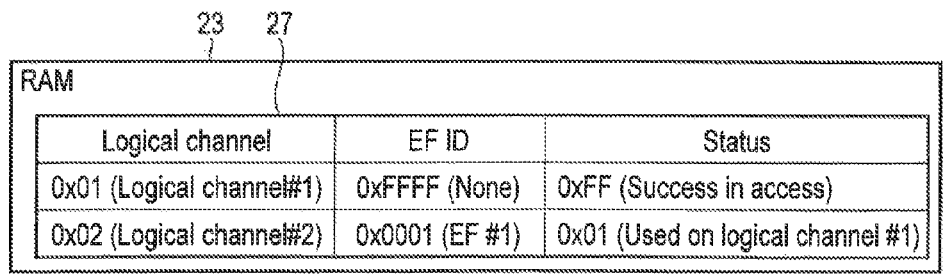
FIG. 7 shows an example of an access status table which includes access information indicating success/failure of access to each EF from each logical channel.

FIG. 7 shows an example of an access status table 27 which stores access information indicative of success/failure of access to EFs on the respective logical channels.

The use status table 27 as shown in FIG. 7 is, for example, provided in the RAM (working memory) 23. In the IC card 2, the use status table 27 may be provided in a rewritable memory which the control element 21 can be accessed by the control element 21, e.g., may be provided in the data memory 22.

The access status table 27 stores, as access information, information and a status indicating either a file (EF) which succeeded or failed in access on each of the logical channels. As for a file which failed in access, the access status table 27 stores the information (logical channel number) indicating a logical channel using the file, as a value of the Status.

In the example shown in FIG. 7, "Status=0x00 to 0x13" indicates that an EF denoted at an EFID could not be accessed (inaccessible) and further indicates that information (logical channel number) indicates a logical channel using the EF. "Status=0xFF" indicates that access succeeded to the EF denoted at the EFID on the logical channel. However, if "EFID=0xFFFF" and "Status=0xFF" are both given, a corresponding logical channel is indicated to be unused (there is no EF used).

Next, operation of the IC card 2 according to the present embodiment will be described.

The IC card 2 has a function of performing processing for each logical channel. That is, the IC card 2 receives a command from the IC card processing apparatus as an external device and performs processing demanded by the command received by the command from the IC card processing apparatus as an external device, as processing on a specified logical channel. When a command (for example, a read command or en update commend) which requests processing causing access to a specified EF is received, the IC card 2 inhibits access to the specified EF if the EF specified by the command is unsharable and is used on another logical channel. The IC card 2 further outputs a response added with information indicating that access is inhibited because the specified EF is used on another logical channel.

Further, if an EF specified by a command is used on another logical channel (if a response is made informing of access made unable because of use on another logical channel) and is therefore made inaccessible, the IC card 2 responds with a response message (hereinafter also referred to simply as a message) to processing of another command on the same logical channel (for example, a command which requests access to another EF), in subsequent processing, with the message added with information indicating a use status of the EF (for example, information indicating whether the EF which has been made inaccessible is still used or unused on another channel).

Figure 8:
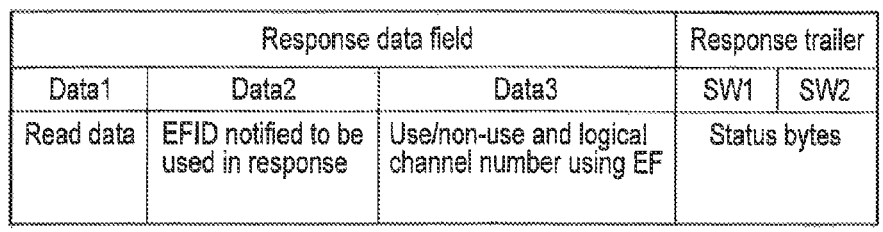
FIG. 8 shows an example configuration of a response message as a response to a command.

FIG. 8 shows an example configuration of a response message as a response to a command.

FIG. 8 shows an example configuration of a data format of a response message to a read command, as an example of a response message output from the IC card 2 to which the present embodiment is applied. The data format of the response message may be specified by a standard used for the IC card. For example, the data format of a response message may comply with Application Protocol Data Unit (APDU) defined under ISO/IEC 7816-3 (ISO/IEC 7816-3 12.1 Application protocol data unit) and ISO/IEC 7816-4 (ISO/IEC 7816-4 5.1 Command-response pairs). Based on the standard as described above, a response data message is configured by a data part (Data filed) and a status part (SW1-SW2: Status bytes).

In the example shown in FIG. 8, the data format (response data) of a response message is configured by a data part (Response data filed) and a status part (Response trailer). FIG. 8 shows an example configuration of a response message to a read command.

The data part (Response data field) of a response message comprises "Data1", "Data2", and "Data3". An execution result (for example, data read as a processing of a read command) of a command is stored in "Data1", for example. An identifier (EFID) of a specified EF is stored in "Data2". A status (a logical channel number using the specification EF or "unused") of the specification EF is stored in "Data3". For example, if a specified ES is used, a logical channel number using the EF is set to "Data3 0x00–0x13" as the value of Data3. If the EF is unused, "Data3 0xFF" is set. "Data3=others" denotes RFU.

Further, the status part (Response trailer) of a response stores information showing an execution result of a command as SW1 and SW2.

For example, "SW1–SW2=0x9000" indicates that a command is normally terminated (if the command is a read command, reading is normally terminated).

In the present embodiment, "SW1–SW2=0x9001" indicates that a corresponding command is normally terminated (normal termination of reading) and that an EF which has been made inaccessible before the command and a use status of the EF have been stored into the data part. That is, "SW1–SW2=0x9001" indicates that a command is normally terminated. The last three bytes (data part of a response message) indicate an identifier of a file which is inaccessible because the file is already used on another logical channel by a command executed before execution of the command.

Further, "SW1–SW2=0x69FF" indicates that a specified EF is used on another logical channel and is therefore inaccessible, resulting in that the command is abnormally terminated. Further, if the status part of a response message is "SW1–SW2=0x69FF", the data part of the response message stores the EF which has been made inaccessible and information indicating the logical channel using the FF. For example, if the status part of the response of a read command is "SW1–SW2=0x69FF", the data part of the response is added with information indicating that the EF specified by the read command has been made inaccessible and also indicating information indicating another logical channel using the specified EF.

FIGS. 9, 10, and 11 show examples of a response message to a read command.

FIG. 9 shows a first specific example of a response message. FIG. 9 shows an example of the response message when the EF (EFID: 0x0001) specified by a read command is unsharable and is used on another logical channel.

In the response message shown in FIG. 9, "Data2=0x0001" is given, "Data3=0x01" denotes EFID: 0x0001, and "SW1–SW2=0x69FF" is given. According to the definition as described above, the response message shown in FIG. 9 has a meaning as follows. The EF denoted at an EFID which is targeted to access by a command is unsharable and is used on another logical channel "#1". Therefore, the command could not be executed (i.e., the specified EF could not be accessed). In the example shown in FIG. 9, since the read command was not executed, "Data1" where read data is to be stored stores no data.

FIG. 10 shows a second specific example of the response message. FIG. 10 shows an example of the response message if a command processing on an EF whose EFID specified in the read command is other than 0x0001 succeeded. Further, in the response message shown in FIG. 10, information indicating an execution result of a command is added with information indicating a current status of an EF which was used on another logical channel. The example shown in FIG. 10 shows a case that the EF which was used on another logical channel is still currently used on another logical channel.

In the response message shown in FIG. 10, the data read from the specified EF (which has an EFID other than 0x0001) is stored in "Data1". In addition, "Data2=0x0001", "Data3=0x01", and "SW1–SW2=0x69FF" are given. According to the definitions described above, the response message shown in FIG. 10 is "SW1–SW2=0x9001". Therefore, the response message indicates that the command itself is normally terminated and that an EF (EFID: 0x0001) which has been made inaccessible prior to the command is used on the logical channel #1.

FIG. 11 shows a third specific example of the response message. FIG. 11 shows an example of the response message if a command processing on an EF whose EFID specified by the read command is other than 0x0001 succeeded. In the response message shown in FIG. 11, information indicating an execution result of a command is added with information indicating a current status of an EF which was used on another logical channel. The example of FIG. 11 shows that the EF which was used on another logical channel is currently unused.

That is, in the example shown in FIG. 11, the data read from the specified EF (which has an EFID other than 0x0001) is stored in "Data1". In addition, "Data2=0x0001", "Data3=0x01", and "SW1–SW2=0x69FF" are given. Therefore, according to the definition above, the response message shown in FIG. 11 is "SW1–SW2=0x9001". Therefore, the response message indicates that the command itself has been normally terminated and that the EF (EFID: 0x0001) made inaccessible prior to the command is unused.

Next, descriptions will be made of transitions of the use status table 26 and the access status table 27, and an example of the response message corresponding to statuses in each of the tables.

Figure 13:
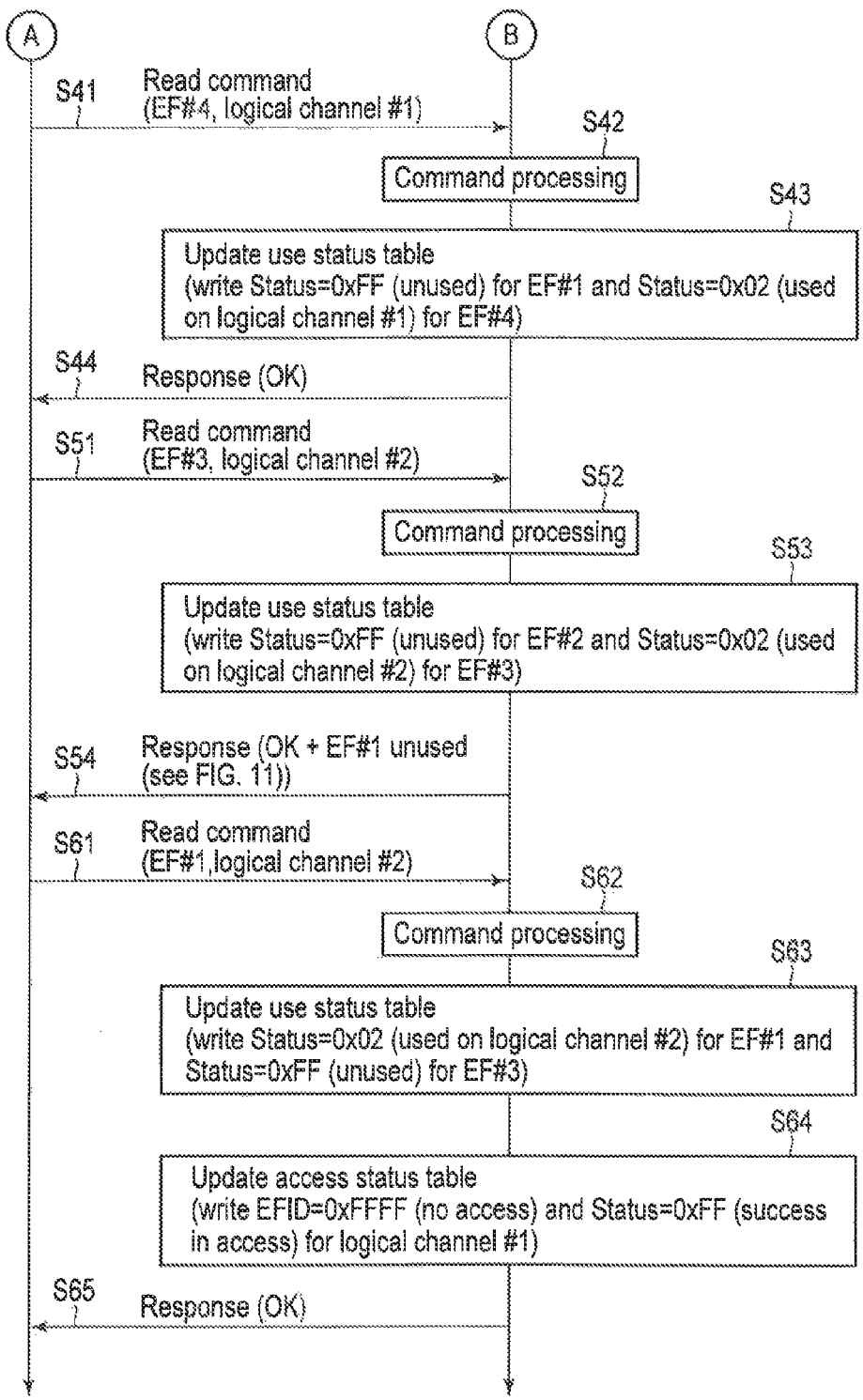
FIG. 13 is also a sequence chart for explaining content of processings in response to a plurality of commands supplied from the IC card processing apparatus according to the embodiments.

FIG. 12 and FIG. 13 each are a sequence chart for explaining content of processing in response to a plurality of commands supplied from the IC card processing apparatus 1. FIG. 12 and FIG. 13 are sequence diagrams showing an example case until access to an EF#1 succeeds on another logical channel #2 after the EF#1 is used on a logical channel 41. In addition, FIGS. 14A, 15A, 16A, 17A, 18A, 19A, and 20A show states of the use status table 26 in each step of processing shown in FIGS. 12 and 13. FIGS. 14B, 15B, 16B, 17B, 18B, 19B, and 20B show examples of states of the access status table 27 in each step of processing shown in FIGS. 12 and 13.

In the processing shown in FIGS. 12 and 13, a DF and EF#1 to EF#4 correspond to a DF 32 described in FIG. 3 and first to fourth EFs 33 to 36. FCI 41 of the OF 32 is sharable as shown in FIG. 4, and FCI 43 of the first EF (EF#1) is unsharable as shown in FIG. 5.

At first, in the IC card 2, the use status table 26 and the access status table 27 are supposed to be in initial states. FIG. 14A shows an example of the use status table 26 in the initial state, and FIG. 14B shows an example in which the access status table 27 is in the initial state. In these states, the IC card processing apparatus 1 is supposed to transmit a read command which specifies an EF#1 by using a logical channel #1.

The IC card 2 receives a read command which requests reading of the EF#1 by using the logical channel #1, through the communication unit 25 (Step S11). The control element 21 of the IC card 2 determines whether data can be read from the EF#1 by using the logical channel #1, according to the received read command. If the EF#1 is accessible on the logical channel #1, the control element 21 executes command processing of reading data from the EF#1 (Step S12). The command processing may be executed after updating the table 26.

The control element 21 updates the use status table 26 in accordance with the command processing of accessing the EF#1. That is, the control element 21 updates a status value of the EF#1 to a value indicating that the EF#1 is used on the logical channel #1 (Step S13). FIG. 15A shows an example in which the status value of EF#1 (EFID=0x0001) is updated to a value (0x01) indicating that the EF#1 is used by the logical channel #1 in the use status table 26. Further, FIG. 15B shows an example in which the access status table 27 stays in the initial state.

When processing in response to a read command is normally terminated, the control element 21 transmits a response indicating a command processing result, to the IC card processing apparatus 1 as a transmission source of the command (Step S14). Here, supposing that data reading from the EF#1 on the logical channel #1 is normally terminated, the control element 21 transmits a response message to the IC card processing apparatus 1. In the response message, the read data is set in a data part, and a status indicating normal termination is set in a status part.

Next, the IC card processing apparatus 1 is supposed to transmit a read command which specifies the EF#1 to the IC card 2 by using the logical channel #2. When the read command is received by the communication unit 25 (Step S21), the control element 21 of the IC card 2 determines whether or not data can be read from the EF#1 by using the logical channel #2, according to the received read command. Here, since the EF#1 is used on the logical channel #1, the control element 21 determines that access to the EMI on the logical channel #2 is impossible as a result of command processing in response to the command (Step S22).

In this case, the control element 21 updates access information on the logical channel #2 on the access status table 27 to information indicating that the EF#1 is used on the logical channel #1 (Step S23). FIG. 16A shows that the use status table 26 stays as shown in FIG. 15A. FIG. 16B shows that, in the access status table 27, an EFID for the logical channel #2 is updated to an EFID (0x0001) of the EF#1, and the status is updated to information (0x01) indicating that the EF is used on the logical channel #1.

If an EF specified by a read command is used on another logical channel and is therefore inaccessible, the control element 21 transmits a response message to the IC card processing apparatus 1 (Step 324). The response message includes information indicating that the command has been abnormally terminated and information indicating a logical channel using the specified EF. For example, the control element 21 creates a response message as shown in FIG. 9, which indicates that the command has been abnormally terminated and that the specified EF#1 is used on the logical channel #1, and transmits the response message to the IC card processing apparatus 1.

Next, the IC card processing apparatus 1 is supposed to transmit a read command which specifies the EF#2 to the IC card 2 by using the logical channel #2. When the read command is received by the communication unit 25 (Step S31), the control element 21 of the IC card 2 determines whether or not data can be read from the EF#2 by using the logical channel #2, according to the received read command. Here, since the EF#2 is inaccessible, the control element 21 executes command processing of reading data from the EF#2 on the logical channel #2 (Step S32). The command processing may be executed after updating the table 26.

Also, the control element 21 updates the use status table 26 in accordance with the command processing of accessing the EF#1. That is, the control element 21 updates the status value of the EF#2 to a value indicating that the EF#2 is used on the logical channel #1 (Step S13). FIG. 17A shows a state in which the status value of EF#2 (EFID=0x0002) is updated to a value (0x02) indicating that the EF#2 is used on the logical channel #2 in the use status table 26 shown in FIG. 16A. FIG. 17B shows that the access status table 27 still stays in the state shown in FIG. 16B.

When the processing in response to the read command is terminated normally, the control element 21 checks the access status table 27 and determines whether there exists an EF which has been made inaccessible by use on another logical channel or not. If there exists an EF which is made inaccessible by use on another logical channel (a channel other than the logical channel #2), the control element 21 transmits a response message to the IC card processing apparatus 1 (step S34). For example, the response message includes information indicating that a command is normally terminated, and information indicating that a current status of the EF has been made inaccessible by use on another logical channel. For example, the control element 21 checks that the EF#1 which has been made inaccessible before is still currently used on the logical channel #1, by referring to the access status table shown in FIG. 17B. In this case, the control element 21 creates a response message as shown in FIG. 10, and transmits the response message to the IC card processing apparatus 1. The response message indicates that the command has been normally terminated and that the specified EF#1 is still currently used on the logical channel #1.

Next, the IC card processing apparatus 1 is supposed to transmit a read command which specifies the EF#4 to the IC card 2 by using the logical channel #1. When the read command is received by the communication unit 25 (Step S41), the control element 21 of the IC card 2 determines whether or not data can be read from the EF#4 by using the logical channel #1, according to the received read command.

Here, since the EF#4 is unused, the control element 21 executes a command processing of reading data from the EF#4 on the logical channel #1 (Step S42). The command processing may be executed after updating the table 26.

The control element 21 updates the use status table 26 as the EF#4 is accessed. That is, the control element 21 updates the status value of the EF#4 to a value indicating that the EF#1 is used on the logical channel #1 and changes the status value of the EF#1 which has been used on the logical channel #1 to an unused status (Step S33). This means that the EF#1 is released as the EF used on the logical channel #1 is changed to the EF#4. FIG. 18A shows a state in which the status value of EF#4 (EFID=0x0004) is updated to a value (0x01) indicating that the EF#4 is used on the logical channel #1, and the status value of the EF#1 (EFID=0x0001) is updated to "unused" (0xFF), in comparison with the use status table 26 shown in FIG. 17A. FIG. 18B shows that the access status table 27 remains in the status shown in FIG. 17B.

When the processing in response to the read command is terminated normally, the control element 21 checks the access status table 27 and determines whether there exists an EF which is made inaccessible by use on another logical channel (a channel other than the logical channel #1) or not. There exists no EF which has been made inaccessible by use on another logical channel (a channel other than the logical channel #1) here as shown in FIG. 18B. The control element 21 therefore transmits a response message indicating that the command has been normally terminated, to the IC card processing apparatus 1 (Step S44).

Next, the IC card processing apparatus 1 is supposed to transmit a read command which specifies the EF#3, to the IC card 2 by using the logical channel #2. When the read command is received by the communication unit 25 (Step S51), the control element 21 of the IC card 2 determines whether or not data can be read from the EF#3 by using the logical channel #2, according to the received read command. Here, since the EF#2 is unused, the control element 21 executes command processing of reading data from the EF#3 on the logical channel #2 (Step S52). The command processing may be executed after updating the table 27.

The control element 21 updates the use status table 26 as the EF#3 is accessed. Here, the control element 21 updates the status value of the EF#3 to a value indicating that the EF#3 is used on the logical channel 42, and changes the status value of the EF#2 which has been used on the logical channel 42 to an unused status (0xFF) (Step S13). This means that the EF#2 is released from the log cal channel #2 as the EF used on the logical channel #2 is changed to the EF#4. FIG. 19A shows a state in which the status value of EF#3 (EFID=0x0003) is updated to a value (0x02) indicating that the EF#2 is used on the logical channel #2, and the status value of the EF#2 (EFID=0x0002) is updated to "unused" (0xFF), in comparison with the use status table 26 shown in FIG. 18A. FIG. 19B shows that the access status table 27 remains in the state shown in FIG. 19B.

When the processing in response to the read command is terminated normally, the control element 21 checks the access status table 27 and determines whether there exists an EF which has been made inaccessible by use on another logical channel (a channel other than the logical channel #2) or not. If there exists an EF which has been made inaccessible by use on another logical channel (a channel other than the logical channel #2), the control element 21 transmits a response message to the IC card processing apparatus 1 (step S54). The response message includes information indicating that a command has been normally terminated, and information indicating that a current status of the EF has been made inaccessible by use on another logical channel.

Here, as shown in FIG. 19B, there exists an EF#1 as an EF which has been made inaccessible by use on the logical channel #1. The control element 21 checks a current use status for the EF#1 which has been made inaccessible before being shown in the access status table shown in FIG. 19B, by referring to the access status table 26 shown in FIG. 19A. In the example shown in FIG. 19A, the current status of EF#1 is unused. Therefore, the control element 21 creates a response message as shown in FIG. 11, and transmits the response message to the IC card processing apparatus 1. The response message indicates that the command has been abnormally terminated and that the EF#1 which has been made inaccessible before is currently unused (an inaccessible status).

Next, the IC card processing apparatus 1 is supposed to transmit a read command which specifies the EF#1, to the IC card 2 by using the logical channel #2. When the read command is received by the communication unit 25 (Step S61), the control element 21 of the IC card 2 determines whether or not data can be read from the EF#1 by using the logical channel #2, according to the received read command. Here, since the EF#1 is unused, the control element 21 executes command processing of reading data from the EF#1 on the logical channel #2 (Step S32). The command processing may be executed after updating the tables 26 and 27.

The control element 21 updates the use status table 26 and access status table 27 in accordance with access to the EF#1 on the logical channel #2 (Steps S63 and S64). The control element 21 updates the use status table 26 in accordance with access to the EF#1 on the logical channel #2 (Steps S63 and S64). Here, the control element 21 updates the status value of the EF#1 to a value (0x02) indicating that the EF#1 is used on the logical channel #2, and changes the status value of the EF#2 which has been used on the logical channel #2 to an unused status (0xFF). This means that, as the EF used on the logical channel #1 is changed to the EF#1, the EF#3 is released from the logical channel #2. FIG. 20A shows a state in which the status value of EF#1 (EFID=0x0001) is updated to a value (0x02) indicating that the EF#1 is used on the logical channel #2, and the status value of the EF#3 (EFID=0x0003) is updated to "unused" (0xFF), in comparison with the use status table 26 shown in FIG. 19A.

The control element 21 updates the access status table 27 as the EF#1 is accessed on the logical channel #2 (Step S64). That is, the control element 21 stores the EF#1 as access information for the logical channel #2 on the access status table 27 shown in FIG. 196. Therefore, if access to the EF#1 on the logical channel #2 succeeds, the access status table 27 is updated to information indicating that access to the EF#1 stored as access information for the logical channel #2 succeeded. In FIG. 20B, the access information for the logical channel #2 which exists in the access status table 27 shown in FIG. 19A is overwritten with the EFID of EF#1 and a status indicating success in access. Further, information concerning the EF#1 for the logical channel #2 which exists in the access status table 27 may be deleted. In this manner, no EF which is still inaccessible on the logical channel #2 exists any more in the access status table 27.

When processing in response to the read command is terminated normally, the control element 21 checks the access status table 27 and determines whether there exists an EF which has been made inaccessible by use on another logical channel (a channel other than the logical channel #2)

or not. Here, no EF exists which has been made inaccessible by use on any other logical channel (a channel other than the logical channel #2), as shown in FIG. 20B. The control element 21 therefore transmits a response message indicating that the command has been normally terminated to the IC card processing apparatus 1 (Step S65).

Next, a processing flow when the IC card 2 receives a command will be described.

Figure 21:
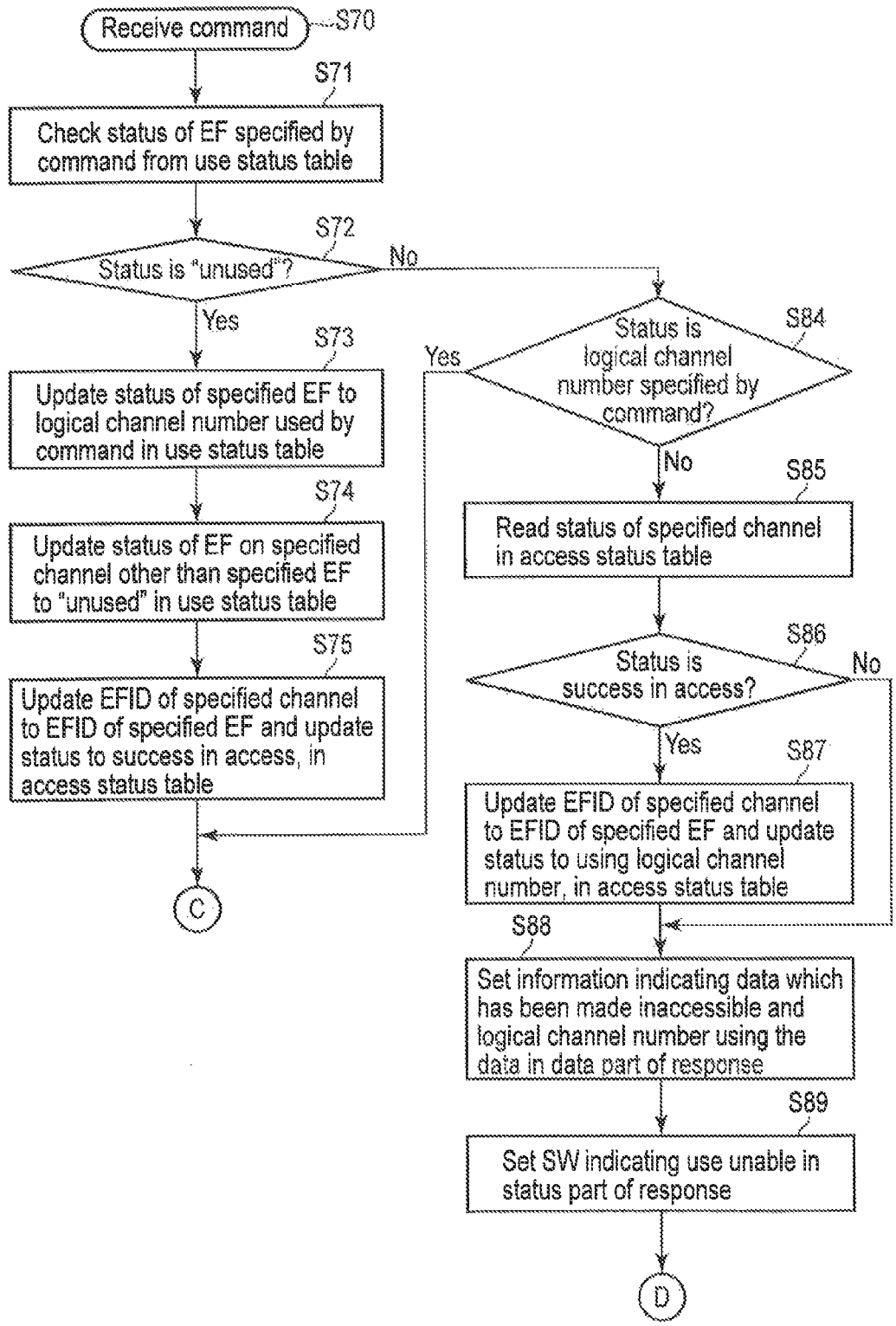
FIG. 21 is a flowchart for explaining a processing flow when the IC card according to the embodiment receives a command.
Figure 22:
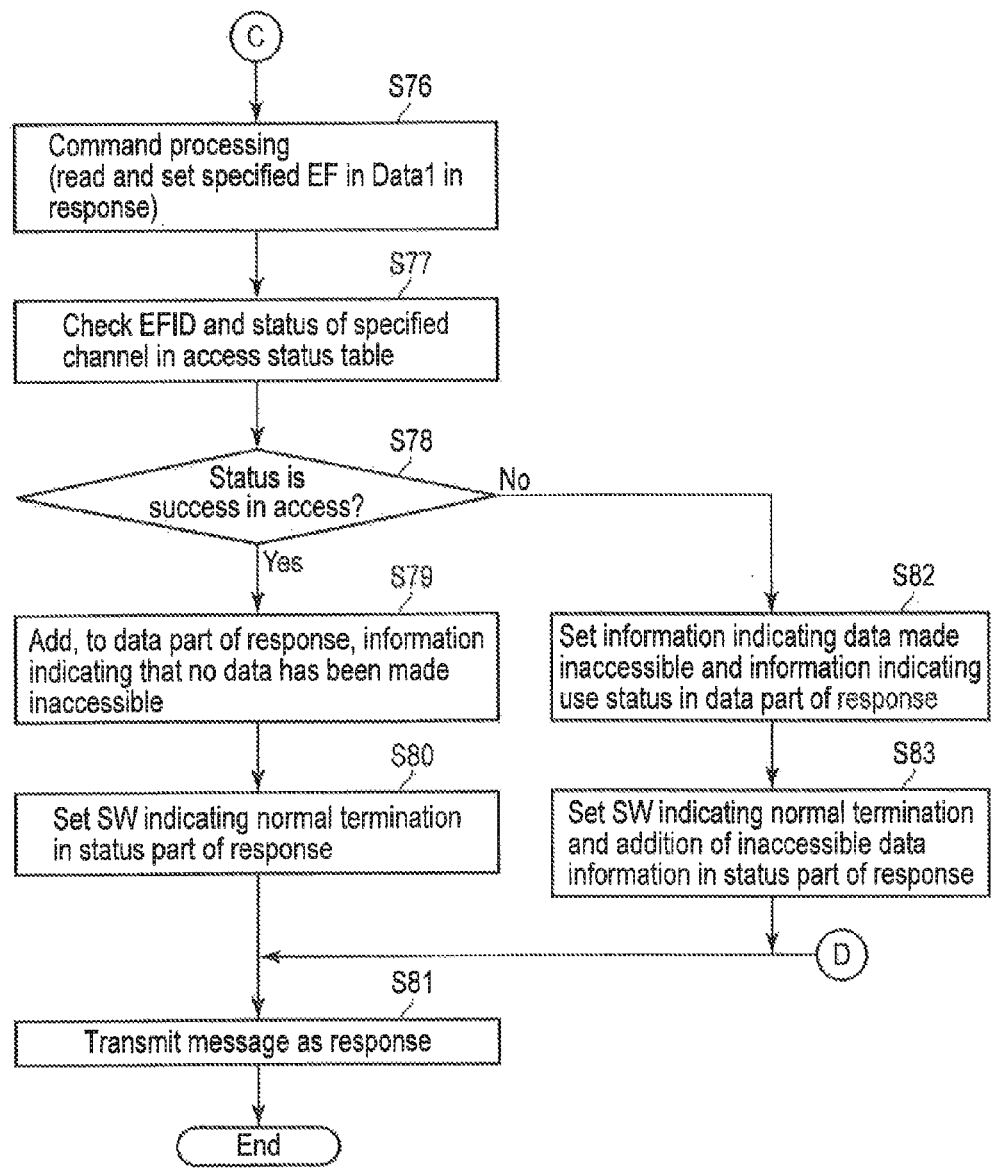
FIG. 22 is a flowchart for explaining a processing flow when the IC card according to the embodiment receives a command.

FIG. 21 and FIG. 22 each are a flowchart for explaining a processing flow when the IC card 2 receives a command.

At first, the IC card 2 is supposed to receive a command from the IC card processing apparatus 1 (Step S70). Here, the command is supposed to request access to a specified EF by using a specific logical channel. For example, a read command or an update command is assumed.

When a command is received by the communication unit 25, the control element 21 checks the status of an EF (an EF as a target which the command is to access) specified by the received command from the use status table 26 (Step S71). The received command is supposed to specify the logical channel number of a logical channel to be used.

If the status of the EF (hereafter also referred to as a specified EF) specified by the received command is "unused" (Step S72, YES), the control element 21 updates the status of the specified EF to the logical channel number of a logical channel (hereafter also referred to as a specified channel) which the command uses, in the use status table 26 (Step S73). In this manner, the specified EF is set as "used" at the logical channel number of the specified channel. Further, the control element 21 updates the status of an EF other than the specified EF, a specified channel of which is set as the status, to "unused" in the use status table 26 (Step S74). In this manner, the EF used on the specified channel is updated to the specified EF of the command, in the use status table 26.

Further, the control element 21 updates the EFID to the EFID of the specified EF, as access information for the specified channel, in the access status table 27, and also updates the status to information indicating success in access (Step S75). When updating of the use status table 26 and access status table 27 is completed, the control element 21 then performs command processing corresponding to the received command (Step S76). For example, if the received command is a read command, the control element 21 reads the data of the specified EF, and stores the data as "Data1" in the data part of a response message. The response message is created on the RAM 23, for example.

Upon completion of command processing, the control element 21 checks the EFID of the specified EFID and the status of the specified channel in the access status table 27 (Step S77). If the status of the specification channel is success in access (Step S78, YES), data indicating an EF which has not yet been made inaccessible on the specified channel is set in the data part of the response message to the command (Step S79). For example, the control element 21 sets "0xFFFF" indicating absence of any applicable file in "Data2" in the data part, and sets "0xFF" indicating "unused" in "Data3".

Further, the control element 21 sets a status indicating normal termination in the status part of the response message whose data part has been set as described above (Step S80). For example, the control element 21 sets "0x9000" as a status indicating normal termination. When the response message is completed, the control element 21 transmits a created response message to the IC card processing apparatus 1 as a transmission source of the command (Step S81).

If the status of the specified channel is success in access as a result of checking the access status table 27 (Step S78, NO), the control element 21 sets, in the data part of the data part of the response message to the command, information indicating an EF which has been made inaccessible on the specified channel and information indicating a current use status of an EF which has been made inaccessible (Step S82). For example, the control element 21 sets, in "Data2" in the data part of a response message, an EFID (the EFID of an EF which has been made inaccessible) corresponding to the specified channel and stored in the access status table 27. The control element 21 sets the status of the EF stored in the use status table 26 in "Data3".

Further, the control element 21 sets a status indicating normal termination of the command and addition of information of the EF which has been made inaccessible, in the status part of the response message whose data part has been set as described above (Step S83). For example, the control element 21 sets "0x9001" as a status indicating normal termination and addition of information of the EF which has been made inaccessible. When creation of a response message as described above is completed, the control element 21 transmits the created response message to the IC card processing apparatus 1 as a transmission source of the command (Step S81).

If the status of the received command is not "unused" (Step S72, NO), the control element 21 determines whether the status of the specified EF is the logical channel number of a logical channel (the specified channel) which is used in the command or not (Step S84). If the status of the specified EF is the logical channel number of a specified channel, i.e., if the logical channel using the specified EF corresponds to the specified channel (Step S84, YES), the control element 21 goes to Step S76 and executes command processing.

If the status of the specified EF is not the logical channel number of the specified channel, i.e., if the logical channel using the specified EF does not correspond to the specified channel (Step S84, NO), the control element 21 checks the status of the specified channel in the access status table 27 (Step S85). If the status of the specified channel is success in access (Step S86, YES), the control element 21 updates the EFID of the specified EF in access information of the specified channel to the EFID of the specified EF, in the access status table 27, and also updates the status to information indicating the logical channel using the specified EF (Step S87).

If the access status table is updated or if the status of the specified channel has already been access not successful (Step S86, NO), the control element 21 sets information indicating an EF (a specified EF) which has been made inaccessible and information indicating a current use status of the EF which has been made inaccessible, in the data part of the response message to the command (Step S88). For example, the control element 21 sets the EFID of the EF which has been made inaccessible, in "Data2" in the data part of a response message, and also sets the status of the EF (the used logical channel number) stored in the use status table 26, in "Data3".

Further, the control element 21 sets a status indicating abnormal termination of the command and addition of information of the EF which has been made inaccessible, in the status part of the response message whose data part has been set as described above (Step S89). For example, the control element 21 sets "0x9001" as a status indicating normal termination and addition of information of the EF which has been made inaccessible. When creation of a response message as described is completed, the control element 21 transmits the created response message to the IC card processing apparatus 1 as a transmission source of the command (Step S81).

As described above, in the present embodiment, a command instructed externally is interpreted and executed. An IC card which responds with a result of the execution is provided with a function by which communication control with an external device through a physical communication interface can be performed through a plurality of logical communication channels. The IC card expresses, as a status byte of a response message to a command, that a file is used on another logic channel in a response message to file access through a logical channel. Further, after the IC card expresses as the status byte of the response message that the file is used on another logical channel, the use status of the file is added to the response Message for command execution through the same logical channel until the file is accessed through the same logical channel.

The response message may be configured to add use statuses of a plurality of files to a response.

Further, use statuses of logical channels may be managed not only in units of files but also in units of data objects or in units of records, as data units stored in files. In this case, the IC card may be configured to add, to the response message, use statuses of the logical channels in units of data objects or in units of records.

According to the embodiment described above, the IC card can notify that a file is used on another logical channel, in a response to a command which causes file access. In the IC card, if a file is made inaccessible because a file as an access object in a command using a logical channel is already used on another logical channel, a use status of the file which has been made inaccessible can be added to a response message in response to a command subsequent to execution through the logical channel which has been made inaccessible. In this manner, the IC card can, at an arbitrary time, recognize a use status of a file which has been made inaccessible. As a result, the IC card need not repeatedly retry access to the file and can execute command processing efficiently.

That is, according to the embodiment, the IC card can add use a status of a file which has been made inaccessible because the file has been used on another channel, to each of response messages of subsequent commands. Therefore, the IC card need not repeatedly retry access even if access to a file fails. As a result, the IC card can accelerate the total processing time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC Card, comprising:
  a communication unit configured to perform data communication with an external device;
  a data memory configured to store data in units of data as a target to access, according to a command from an external apparatus;
  a working memory configured to store use statuses, on a plurality of logical channels, of each piece of data stored in the data memory; and
  a controller configured to
    perform the data communication of the communication unit by using a logical channel selected from the plurality of logical channels, and to perform access to first data or second data a specified by the command received by the communication unit, on a first logical channel specified by the command, and
    output, by referring to the use statuses stored in the working memory, as a response to the command, a response message comprising: (i) a data section including (a) first information indicating the target to access designated by the command and (b) second information indicating the first use status or the second use status of the first data or the second data indicated as the target to access designated by the command; and (ii) a status section including information representing processing results of the command,
  wherein the controller performs access to the first data on a second logical channel and stores, in the working memory, the first use status indicating that the first data is used on the second logical channel, then performs access to the second data on the second logical channel and stores, in the working memory, the second use status indicating that the second data is used on the second logical channel, and updates the first use status to a third use status indicating that the first data is unused,
  the first information includes information added to the response message of the command, the information added to the response message indicating that the first data or the second data specified by the command has been made inaccessible because the first data or the second data has been used on another logical channel, if the first data or the second data specified by the command has been made inaccessible because the first data or the second data specified by the command has been used on a channel other than the first logical channel specified by the command.

2. The IC Card according to claim 1, wherein
the controller adds, to the data section of the response message, a logical channel in which the data is used or information representing an unused state of the data, as information representing the use statuses the data.

3. The IC Card according to claim 2, wherein
the working memory stores the information indicating the data which has been made inaccessible for each of the logical channels, and
the controller specifies the data which has been made inaccessible on the logical channel of the command, from the information stored in the second storage part, and determines information indicating a use status of the data specified, from the information stored in the first storage part.

4. The IC Card according to claim 3, wherein
the working memory stores either information indicating a used logical channel or information indicating non-use, in association with each piece of the data.

5. The IC Card according to claim 3, wherein
the working memory stores information indicating data which has been made inaccessible and information indicating a logical channel using the data.

6. The IC Card according to claim 4, wherein
the working memory stores information indicating data which has been made inaccessible and information indicating a logical channel using the data.

7. The IC Card according to claim 3, wherein
the controller overwrites the information indicating the data which has been made inaccessible in the working memory with the information indicating the data which has been made accessible, when access to the data which has been made inaccessible on the logical channel succeeds.

8. The IC Card according to claim 4, wherein
the controller overwrites the information indicating the data which has been made inaccessible in the working memory with the information indicating the data which has been made accessible, when access to the data which has been made inaccessible on the logical channel succeeds.

9. The IC Card according to claim 5, wherein
the controller overwrites the information indicating the data which has been made inaccessible, with the information indicating the data which has been made accessible, when access to the data which has been made inaccessible on the logical channel succeeds.

10. The IC Card according to claim 3, wherein
the response message comprises a data part and a status part, and
the controller adds the information indicating a use status of the data which has been made inaccessible, to the data part of the response message.

11. The IC Card according to claim 4, wherein
the response message comprises a data part and a status part, and
the controller adds the information indicating a use status of the data which has been made inaccessible, to the data part of the response message.

12. The IC Card according to claim 5, wherein
the response message comprises a data part and a status part, and
the controller adds the information indicating a use status of the data which has been made inaccessible, to be data part of the response message.

13. The IC Card according to claim 7, wherein
the response message comprises a data part and a status part, and
the controller adds the information indicating a use status of the data which has been made inaccessible, to the data part of the response message.

14. The IC Card according to claim 10, wherein
the controller stores, into the status part, information indicating a use status of the data together with a command processing result, when the controller adds, to the data part, the information indicating a use status of the data which has been made inaccessible.

15. The IC Card according to claim 11, wherein
the controller stores, into the status part, information indicating a use status of the data together with a command processing result, when the controller adds, to the data part, the information indicating the user status of the data which has been made inaccessible.

16. The IC Card according to claim 12, wherein
the controller stores, into the status part, information indicating a use status of the data together with a command processing result, when the controller adds, to the data part, the information indicating a use status of the data which has been made inaccessible.

17. The IC Card according to claim 13, wherein
the controller stores, into the status part, information indicating a use status of the data together with a command processing result, when the controller adds, to the data part, the information indicating a use status of the data which has been made inaccessible.

18. The IC Card according to claim 1, further comprising:
a module which comprises the communication unit, the controller, the data memory, the working memory, and the controller; and
a body comprising the module.

19. A portable electronic apparatus, comprising:
a communication unit configured to perform data communication with an external device;
a data memory configured to store data in units of data as a target to access, according to a command from an external apparatus;
a working memory which stores use status, on a plurality of logical channels, of each piece of data stored in the data memory; and
a controller configured to
perform the data communication of the communication unit by using a logical channel selected from the plurality of logical channels, and to perform access to first data or second data specified by the command received by the communication unit, on a first logical channel specified by the command, and
output, by referring to information stored in the working memory, as a response to the command, a response message comprising: (i) a data section including (a) first information indicating the target to access designated by the command and (b) second information indicating the first or second use status of the first data or the second data indicated as the target to access; and (ii) a status section including information representing processing results of the command,
wherein the controller performs access to the first data on a second logical channel and stores, in the working memory, the first use status indicating that the first data is used on the second logical channel, then performs access to the second data on the second logical channel and stores, in the working memory, the second use status indicating that the second data is used on the second logical channel, and updates the first use status to a third use status indicating that the first data is unused,
the first information includes information added to the response message of the command, the information added to the response message indicating that the first data or the second data specified by the command has been made inaccessible because the first data or the second data has been used on another logical channel, if the first data or the second data specified the command has been made inaccessible because the first data or the second data specified by the command has been used on a channel other then the first logical channel specified by the command.

20. A command processing method for an IC Card that includes a communication unit, a data memory that stores data in units of data as a target to access, a working memory which use statuses, on a plurality of logical channels, of each piece of data stored in the data memory, and a controller, comprising:
receiving, by the controller in the IC card, a command from an external device by using a logical channel selected;

performing, by the controller, data communication of the communication unit that performs data communication with an external device by using a logical channel selected from the plurality of logical channels, and performing, by the controller, access to first data or second data specified by the command on a first logical channel specified by the command;

causing, when the access to the specified data is performed, the controller to perform access to the first data on a second logical channel and store, in the working memory, the first use status indicating that the first data is used on the second logical channel, then perform access to the second data on the second logical channel and store, in the working memory, the second use status indicating that the second data is used on the second logical channel, and update the first use status to a third use status indicating that the first data is unused; and outputting, by the controller, by referring to the use status stored in the working memory, as a response to the command, a response message comprising: (i) a data section including (a) first information indicating the target to access designated by the command and (b) second information indicating the first use status or the second use status of the first data or the second data indicated as the target to access; and (ii) a status section including information representing processing results of the command, wherein the first information includes information added to the response message of the command, the information added to the response message indicating that the first data or the second data specified by the command has been made inaccessible because the first data or the second data has been used on another logical channel, of the first data or the second data specified by the command has been made inaccessible because the first data or the second data specified by the command has been used on a channel other than the first logical channel specified by the command.

* * * * *